United States Patent
Karczewicz et al.

(10) Patent No.: US 6,507,617 B1
(45) Date of Patent: Jan. 14, 2003

(54) VIDEO CODING

(75) Inventors: Marta Karczewicz, Irving, TX (US); Levent Oktem, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/427,912

(22) Filed: Oct. 27, 1999

(30) Foreign Application Priority Data

Oct. 27, 1998 (GB) .............................................. 9823442

(51) Int. Cl.[7] .................................................. H04N 7/12
(52) U.S. Cl. .................................................. 375/240.16
(58) Field of Search ....................... 375/240.12, 240.16, 375/240.27

(56) References Cited

U.S. PATENT DOCUMENTS 6,141,675 A * 10/2000 Slavenburg et al. ........ 708/706
6,266,091 B1 * 7/2001 Saha et al. ............. 375/240.16
6,289,053 B1 * 9/2001 Varanasi et al. ........ 375/240.17
6,345,146 B1 * 2/2002 Sako et al. ..................... 386/94
6,404,816 B1 * 6/2002 Her ........................ 375/240.18

FOREIGN PATENT DOCUMENTS

WO WO 97/16025 5/1997
WO WO 97/40628 10/1997

* cited by examiner

Primary Examiner—Chris Kelley
Assistant Examiner—George A. Bugg
(74) Attorney, Agent, or Firm—Perman & Green, LLP

(57) ABSTRACT

This invention relates to a system for compression of video sequences that is using motion compensated prediction. The key part of such system is motion vector field coding. The goal of motion vector field coding is to minimize the number of bits necessary for representation of the motion vector field while retaining at the same time very low prediction error. This invention discloses new matrix operations in the motion analyzer of the motion field coder.

16 Claims, 3 Drawing Sheets

THE ENCODER FOR THE MOTION COMPENSATED CODING OF VIDEO

THE DECODER FOR THE MOTION COMPENSATED CODING OF VIDEO

SCHEMATIC DIAGRAM OF THE MOTION ANALYZER
BLOCK OF PRESENT INVENTION

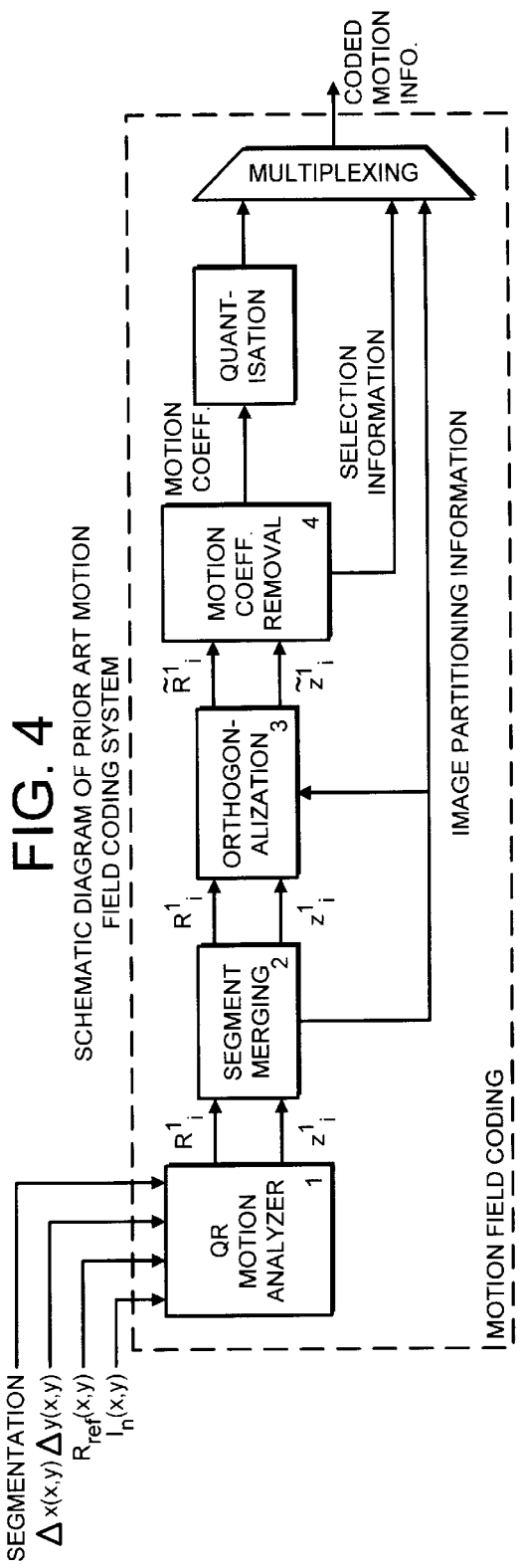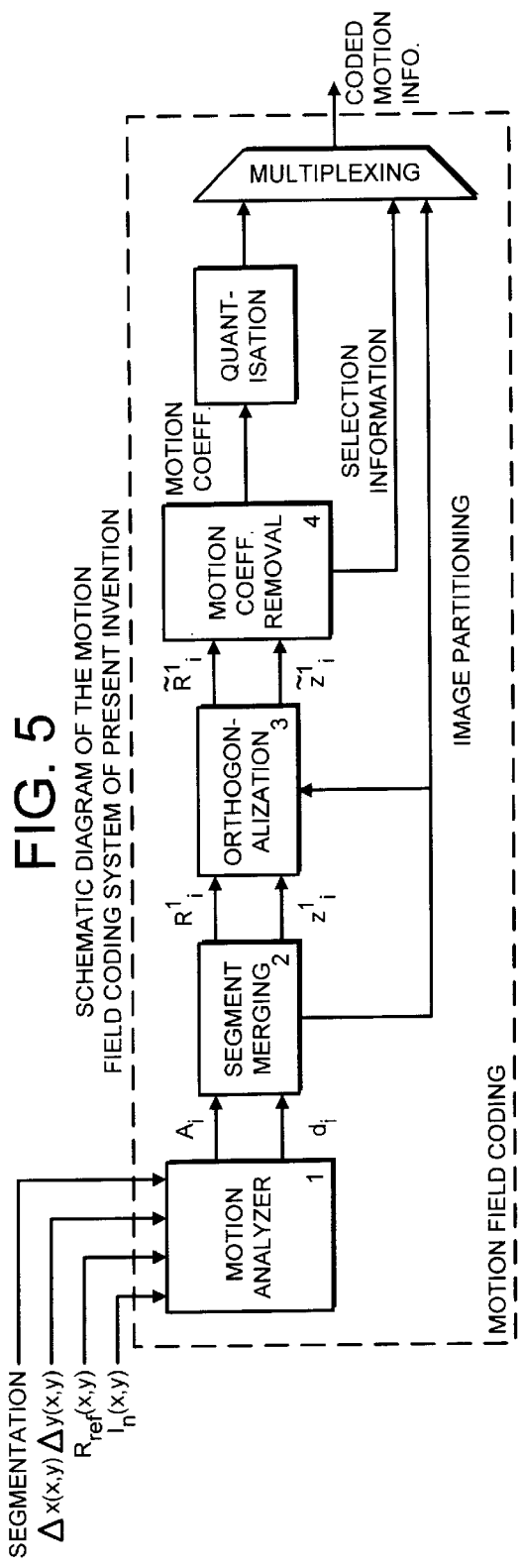

VIDEO CODING

BACKGROUND OF THE INVENTION

The present invention relates to video data encoding and decoding, and more particularly relates to the compression and decompression of video data using motion compensated prediction.

A schematic diagram of a video coding system using motion compensated prediction is shown in FIG. 1 and FIG. 2 of the accompanying drawings. FIG. 1 illustrates an encoder and FIG. 2 illustrates a corresponding decoder. Motion compensated prediction in such a system is outlined below.

In typical video sequences the change in the content of successive frames is to a great extent the result of the motion in the scene. This motion may be due to camera motion or due to motion of an object depicted in the scene. Therefore, typical video sequences are characterised by significant temporal correlation, which is highest along the trajectory of the motion, and efficient compression of video sequences requires exploitation of this property of video sequences. Motion compensated (MC) prediction is a widely recognised technique for compression of video. It utilises the fact that in a typical video sequence, the image intensity value in a particular frame can be predicted using image intensities of some other already coded frame, given the motion trajectory between these two frames.

In the encoder shown in FIG. 1 the Motion Estimation block calculates motion vectors $(\Delta x(x,y), \Delta y(x,y))$ of pixels between the frame being coded $I_n(x,y)$, called the current frame, and a reference frame denoted $R_{ref}(x,y)$.

The reference frame is one of the previously coded frames (e.g. the frame preceding the one being coded) which at a given instant is available in the Frame Memory of the encoder and of the decoder. The pair of numbers $(\Delta x(x,y), \Delta y(x,y))$ is called the motion vector of the pixel at location $(x,y)$ in the current frame, and $\Delta x(x,y)$ and $\Delta y(x,y)$ are the values of horizontal and vertical displacement, respectively.

The set of motion vectors of all pixels in the current frame, called a motion vector field, is compressed by the Motion Field Coding block and transmitted to the decoder. To indicate that the compression of the motion vector field is typically lossy the compressed motion vectors are denoted as $(\tilde{\Delta}x(x,y), \tilde{\Delta}y(x,y))$. In the Motion Compensated (MC) Prediction block, the compressed motion vectors $(\tilde{\Delta}x(x,y), \tilde{\Delta}y(x,y))$ and the reference frame are used to construct the prediction frame $P_n(x,y)$:

$$P_n(x,y) = R_{ref}(x + \tilde{\Delta}x(x,y), y + \tilde{\Delta}y(x,y)). \quad (1)$$

The prediction error, i.e., the difference between the current frame $I_n(x,y)$ and the prediction frame $P_n(x,y)$:

$$E_n(x,y) = I_n(x,y) - P_n(x,y), \quad (2)$$

is compressed and sent to the decoder. The compressed prediction error is denoted as $\tilde{E}_n(x,y)$.

In the decoder shown in FIG. 2 pixels of the current coded frame $\tilde{I}_n(x,y)$ are reconstructed by finding the prediction pixels in the reference frame $R_{ref}(x,y)$ using the received motion vectors and by adding the received prediction error $\tilde{E}_n(x,y)$, i.e., $$\tilde{I}_n(x,y) = R_{ref}(x + \tilde{\Delta}x(x,y), y + \tilde{\Delta}y(x,y)) + \tilde{E}_n(x,y). \quad (3)$$

$\tilde{I}_n(x,y)$ is not identical to $I_n(x,y)$, due to the loss introduced in coding. The difference between the coded frame and the original frame $$D_n(x,y) = I_n(x,y) - \tilde{I}_n(x,y) \quad (4)$$

is called the reconstruction error.

An objective of motion compensated prediction is to find an optimum trade-off between the amount of information which needs to be transmitted to the decoder and the loss introduced in encoding, i.e., 1. minimize the amount of prediction error, and
2. minimize the amount of information needed to represent motion vector field.

Due to the very large number of pixels in a frame it is not efficient to transmit a separate motion vector for each pixel. Instead, in most video coding schemes, the current frame is divided into larger image segments so that all motion vectors of the segment can be described by a few coefficients. Depending on the way the current frame is divided into the segments, two types of motion compensator coders can be distinguished;

1. Block based coders where the current frame is divided into fixed and known blocks e.g. 16×16 pixel blocks in International Standard ISO/IEC MPEG 1 or ITU-TH.T6 1 codecs (see FIG. 3a), or
2. Segmentation based, i.e. region based, coders where the current frame is divided into arbitrarily shaped segments, e.g. obtained by a segmentation algorithm FIG. 3b.

A frame of a typical video sequence contains a number of objects with different motion. MC prediction is performed by dividing the frame $I_n(x,y)$ into several segments $S_k$ and estimating the motion of these segments between that frame and the reference frame $R_{ref}(x,y)$. In practice, a segment includes at least a few tens of pixels. In order to represent the motion vectors of these pixels compactly, it is desirable that their values are described by a function of few parameters. Such a function is called a motion vector field model. Motion compensated video coding schemes approximate the motion vectors of an image segment using a general formula:

$$\hat{\Delta}x(x, y) = \sum_{n=1}^{N} c_n f_n(x, y), \quad (5)$$

$$\hat{\Delta}y(x, y) = \sum_{n=N+1}^{N+M} c_n f_n(x, y), \quad (6)$$

where parameters $c_n$ are called motion coefficients and are compressed and transmitted to the decoder. The compressed motion coefficients will be denoted as $\tilde{c}_n$. Functions $f_n$ are called basis functions and have to be known both to the encoder and decoder. Segmentation information is an inherent part of motion representation and it also needs to be coded and transmitted to the decoder. In the decoder, segmentation information and coefficients $\tilde{c}_n$ are used to obtain the compressed motion vector field for each segment:

$$\tilde{\Delta}x(x, y) = \sum_{n=1}^{N} \tilde{c}_n f_n(x, y), \tilde{\Delta}y(x, y) = \sum_{n=N+1}^{N+M} \tilde{c}_n f_n(x, y). \quad (7)$$

In the encoder, the Motion Field Coding block aims to minimise the number of bits necessary for representation of the motion vector field while at the same time retaining low prediction error. The total number of bits needed to represent the motion vector field depends on:

the number of segments in the image, the number of motion coefficients per segment, the number of bits required to represent the motion coefficients.

A prior art system for performing Motion Field Coding is shown in FIG. 4, and consists of 4 main building blocks: a QR Motion Analyzer 1, a Segment Merging block 2, an Orthogonalization block 3 and a Motion Coefficient Removal block 4. Such a system is described in PCT publications WO97/16025 and WO97/40628.

The inputs to the Motion Field Coding block are:

the motion vector field $(\Delta x(x,y), \Delta y(x,y))$ found by the Motion Estimation block, the current frame, a reference frame, and initial segmentation of the current frame. The initial segmentation can be obtained in the encoder before or during Motion Estimation. The segmentation can also be provided to the encoder by some external means.

The Motion Field Coding block can reduce the total number of bits which have to be sent to the decoder by:

Reducing the number of segments by combining (merging) together those segments which can be predicted with a common vector of motion coefficients without causing a large increase of prediction error. The process of combining such segments is called motion assisted merging, and is performed by the Segment Merging block 2.

Using basis functions which have low sensitivity to quantization (performed by the Quantisation block 5) of corresponding motion coefficients so that these coefficients can be represented with a small number of bits. It has been found that coefficients corresponding to discrete orthogonal functions are robust to quantization. Therefore, after segment merging, basis functions are orthogonalized with respect to the rectangle circumscribing the segment. This is done by the Orthogonalisation block 3.

Finding for each segment a minimal number of basis functions which achieve a satisfactorily low prediction error. Only coefficients corresponding to these selected basis functions have to be transmitted to the decoder. The process of such adaptive selection of basis functions and corresponding motion coefficients is performed by the Motion Coefficient Removal block 4.

The function of the QR Motion Analyzer 1 is to find a representation of the motion vector field which can be used downstream by the Segment Merging block 2 and Motion Coefficient Removal block 4 to efficiently calculate motion coefficients corresponding to different combinations of segments and basis functions. The QR Motion Analyzer 1 and Segment Merging block 2 operate as follows.

The QR Motion Analyzer 1 performs a plurality of steps comprising matrix operations. These are described in detail in PCT publications WO97/16025 and WO97/40628. In the first step the prediction frame is approximated so that the prediction frame becomes linear with respect to motion vectors. In the second step a matrix $E_k$ and vector $q_k$ are constructed for each segment $S_k$ of the prediction frame and are used for minimisation of the square prediction error. In the third step the well known QR factorization algorithm is used to decompose the matrix $E_k$ into a product of two matrices $Q_k$ and $R_k$, where $Q_k$ is a unitary matrix, and $R_k$ is an upper triangular matrix. In addition, an auxiliary vector $z_k$ is calculated from the factor matrix $Q_k$ and the matrix $q_k$. Part of the matrix $R_k$ and the auxiliary vector $z_k$ are applied to the Segment Merging block 2.

The Segment Merging block performs merging operation for pairs of neighbouring segments $S_i$ and $S_j$ by finding whether the pixel values in the combined area can be predicted using a common motion coefficient vector. If the area of the combined segments can be coded using one vector of motion coefficients, without excessive increase of distortion defined as prediction error, thus yielding a better trade-off between reconstruction error and number of transmitted bits, then these segments are merged. In the matrix operations a matrix equation is firstly formed, thereafter the factor matrices are processed using known matrix computation methods. The result is a matrix equation, where one matrix includes terms on the basis of which it is easy to calculate the square prediction error in the area of the merged segments. If the change of the square prediction error is acceptable according to a chosen criterion, the segments are merged.

After all pairs of segments are considered, the output of the Segment Merging block 2 is:

i. a new division of the image with a reduced number of segments, ii. for each new segment the block outputs matrix $R^1_k$, vector $z^1_k$, iii. merging information which is sent to the decoder and helps the decoder to identify the segments which were merged.

Overall, the outputs of Motion Field Coding block are:

information describing image segmentation, information on which coefficients are transmitted to the decoder, quantised values for the transmitted motion coefficients.

It is crucial that Motion Field Coding is computationally simple so that it enables the encoder to process the data at the incoming rate.

This invention proposes to introduce changes in the Motion Field Coding system described above.

SUMMARY OF THE INVENTION

Accordingly, in one aspect, the invention provides a video codec for motion compensated encoding of video data, the video codec providing a motion vector field of video pixels of a current frame to be coded relative to a reference frame, and having a motion field coder for coding the motion vector field to provide compressed motion information, the motion field coder including a motion analyzer comprising means for calculating and storing for each segment k of the current frame an approximation matrix $E_k$ and an approximation vector $q_k$ such that a predefined measure $\Delta e_k$ for distortion in each segment is a function of $(E_k c_k - q_k)$, $c_k$ being a vector approximating said motion vector field as motion coefficients $c_n$ of a set of polynomial basis functions $f_n$, and means for generating motion analyzer output parameters including an output matrix $A_k$ and an output vector $d_k$, wherein $A_k$ is the product of $E_k$ transpose and $E_k$, and $d_k$ is a product of $E_k$ transpose and $q_k$.

Here, the denomination k is a general denomination representative of any segment of a video frame.

By means of the invention, the representation of the motion vector field in the Motion Analyser is different to that in the prior art systems, and is obtained with substantially lower computational complexity, thus requiring less computing power, memory and enabling downsizing. More specifically, these changes substantially simplify the computations without compromising performance, thus speeding up the encoding process.

It is preferred that the motion field coder includes a Segment Merging block receiving the output of the Motion Analyzer, the Segment Merging block comprising merging means for merging pairs of neighbouring segments $S_i$ and $S_j$ if the pixel values in the combined area can be predicted using a common motion coefficient vector, said merging means determining a common motion coefficient vector $c_k$ for a merged segment $S_k$ by solving the linear equations $$A_k c_k = d_k$$

where $A_k$ is a merged matrix given by the sum of motion analyser output matrices $A_i$ and $A_j$ and $d_k$ is a merged vector given by the sum of motion analyser output vectors $d_i$ and $d_j$ of segments $S_i$ and $S_j$ respectively.

Such a solution for motion assisted merging provides a single vector of motion coefficients which allow a good prediction of combined segment.

In a second aspect of the invention, there is provided a method for motion compensated encoding of video data comprising providing a motion vector field of video pixels of a current frame to be coded relative to a reference frame, and coding the motion vector field to provide compressed motion information, said coding of the motion vector field comprising, calculating and storing for each segment k an approximation matrix $E_k$ and an approximation vector $q_k$ such that a predefined measure $\Delta e_k$ for distortion in each segment is a function of $(E_k c_k - q_k)$, $c_k$ being a vector approximating said motion vector field as motion coefficients $c_n$ of a set of polynomial basis functions $f_n$, and generating motion analyzer output parameters including an output matrix $A_k$ and an output vector $d_k$, wherein $A_k$ is the product of $E_k$ transpose and $E_k$, and $d_k$ is a product of $E_k$ transpose and $q_k$.

The invention further includes a decoder operating in accordance with the principle of the present invention.

BRIEF DESCRIPTION OF THE DRAWINGS

The present invention will now be described by way of example with reference to the following drawings in which:

FIG. 4 is a schematic diagram of a prior art motion field coding system;

FIG. 5 is a schematic diagram of a motion field coding system in accordance with a preferred embodiment of the present invention.

DETAILED DESCRIPTION OF THE DRAWINGS

Figure 1:
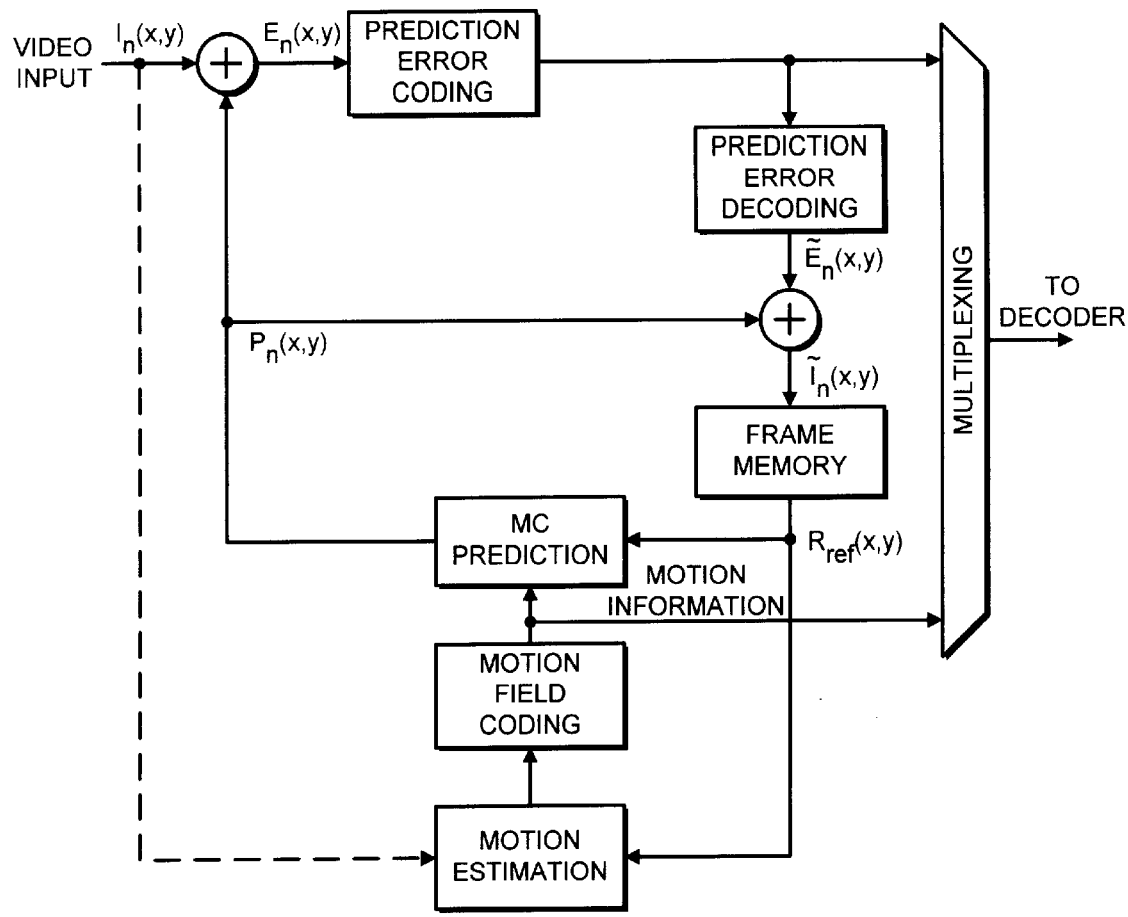
FIG. 1 is a schematic diagram of a known encoder.
Figure 2:
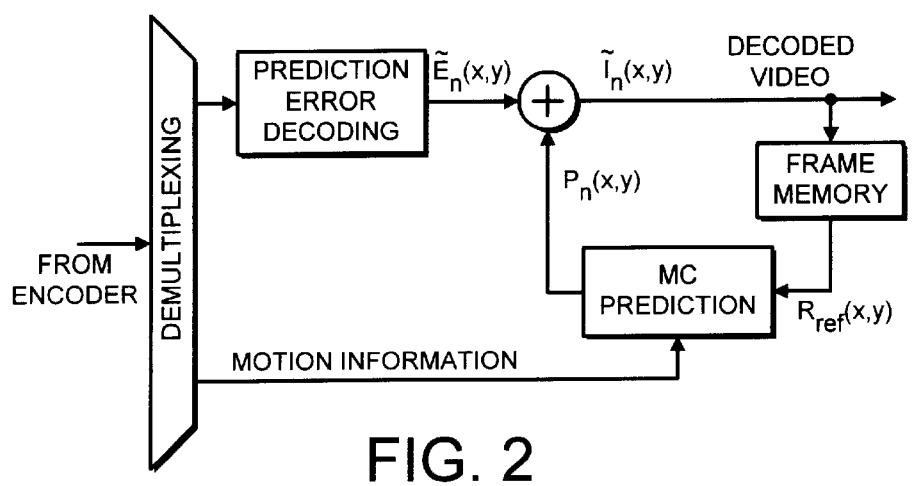
FIG. 2 is a schematic diagram of a known decoder.
Figure 3:
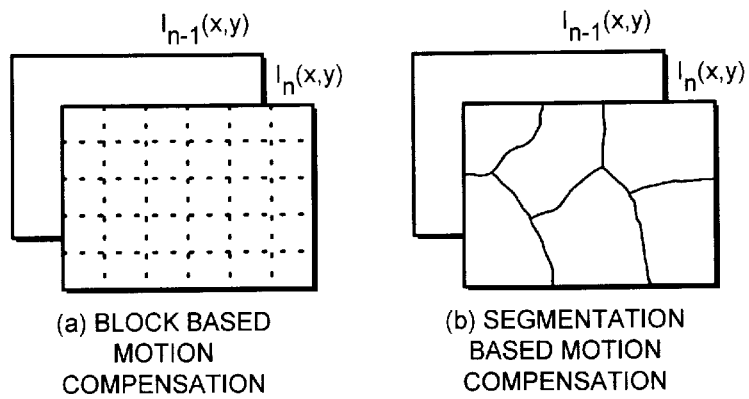
FIG. 3a illustrates division of a current frame for block based motion compensation.
FIG. 3b illustrates division of a current frame for segmentation based motion compensation.

Referring initially to FIG. 1, the output of the video encoder shown therein is the compressed frame divided into segments $S_k$ and each of the segments $S_k$ is accompanied by information regarding motion vectors $[\Delta x(x,y), \Delta y(x,y)]$ for each pixel (x, y) of the respective segment. Then for a segment $S_k$ which consists of P pixels with coordinates $(x_i, y_i)$, i=1,2 ... P, the task of the motion field encoder is to find motion coefficients from the motion vector field $[\Delta x(x_i, y_i), \Delta y(x_i, y_i)]$ output by the motion estimation block. The motion coefficients, denoted by $c=(c_1, c_2, \ldots c_{N+M})$ represent a compressed motion vector field $[\hat{\Delta}x(x,y), \hat{\Delta}y(x,y)]$ which approximates $[\Delta x(x,y), \Delta y(x,y)]$ as precisely as necessary using a linear motion model of the form:

$$\hat{\Delta}x(x, y) = \sum_{n=1}^{N} c_n f_n(x, y), \tag{8}$$

$$\hat{\Delta}y(x, y) = \sum_{n=N+1}^{N+M} c_n f_n(x, y), \tag{9}$$

such that the square prediction error is minimised, SPE being given by $$SPE = \sum_{i=1}^{P} \left(I_n(x_i, y_i) - R_{ref}(x_i + \hat{\Delta}x(x_i, y_i), y_i + \hat{\Delta}y(x_i, y_i))\right)^2. \tag{10}$$

FIG. 5 illustrates an embodiment of a motion field encoder according to the invention. Its inputs include the reference frame and the current frame. The third input to this block is the motion vector field $[\Delta x(x,y), \Delta y(x,y)]$ produced by the Motion Estimation field block.

To fulfil this task the motion field encoder consists of four main building blocks which are the Motion Analyzer block 1, Segment Merging block 2, Orthogonalisation block 3, Motion Coefficient Removal block 4. The segment Merging block 2, Orthogonalisation block 3 and Motion Coefficient Removal block 4 reduce the amount of motion information which may result in a less accurate prediction and hence and increase in the square prediction error.

Figure 6:
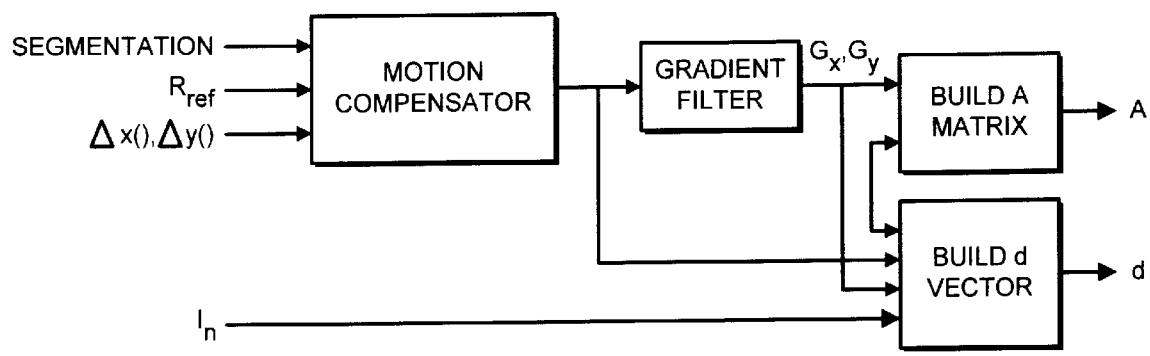
FIG. 6 is a schematic diagram of a motion analyzer according to the embodiment of FIG. 5.

The aim of the Motion Analyzer 1 is to find a representation of the motion field that is suitable for judging efficiently the impact of segment merging, orthogonalisation and coefficient removal on the prediction error. This representation is used later in the three consequent blocks (Segment Merging block 2, Orthogonalisation block 3 and Motion Coefficient Removal block 4) for fast flexible determination of motion coefficients for merged segments and for coefficient removal. FIG. 6 shows an embodiment of a Motion Analyzer in accordance with the present invention.

The Orthogonalisation block 3 and the Coefficient Removal block 4 are described in detail in PCT publications WO97/16025 and WO97/40628, and such descriptions are incorporated herein by reference.

Turning to the Motion Analyzer, for each segment $S_k$ the Motion Analyzer performs the following operations:

Step 1. Approximation of error

When the motion vector field of a segment $S_k$ which consists of P pixels with coordinates $(x_i, y_i)$, i=1,2, ..., P is approximated according to the following formula, $$\hat{\Delta}x(x_i, y_i) = \sum_{n=1}^{N} c_n f_n(x_i, y_i), \hat{\Delta}y(x_i, y_i) = \sum_{n=N+1}^{N+M} c_n f_n(x_i, y_i) \tag{11}$$

the resulting prediction error is equal to $$SPE_k = \sum_{i=1}^{P} \left(I_n(x_i, y_i) - R_{ref}(x_i + \hat{\Delta}x(x_i, y_i), y_i + \hat{\Delta}y(x_i, y_i))\right)^2. \quad (12)$$

During the approximation, $R_{ref}(.)$ in equation 12 is approximated using some known approximation method so that it becomes linearly dependent on $(\hat{\Delta}x(x_p,y_p),\hat{\Delta}y(x_p,y_p))$. Then the square prediction error $SPE_k$ in equation 12 can be approximated as below:

$$SPE_k \approx \sum_{i=1}^{P} (e_{i,1}c_1 + e_{i,2}c_2 + \ldots + e_{i,N+M}c_{N+M} - q_i)^2 \quad (13)$$

The values $e_{i,1}, \ldots, e_{i,N+M}$ and $q_i$ depend on the used approximation method.

Step 2. Construction of matrices

Since the elements under square in equation (13) are linear combinations of coefficients $c_n$, minimization of equation (13) is fully equivalent to minimization of the following matrix expression $$(E_k c_k - q_k)^T (E_k c_k - q_k), \quad (14)$$

where $E_k$, $q_k$ and $c_k$ are given by:

$$E_k = \begin{bmatrix} e_{1,1} & e_{1,2} & \ldots & e_{1,N+M} \\ e_{2,1} & e_{2,2} & \ldots & e_{2,N+M} \\ \ldots & \ldots & \ldots & \ldots \\ e_{P,1} & e_{P,2} & \ldots & e_{P,N+M} \end{bmatrix}, q_k = \begin{bmatrix} q_1 \\ q_2 \\ \ldots \\ q_P \end{bmatrix}, c_k = \begin{bmatrix} c_1 \\ c_2 \\ \ldots \\ c_{N+M} \end{bmatrix}. \quad (15)$$

Step 3. Output calculation

The outputs of the Motion Analyzer 1 are as follows:

1) Matrix $A_k$ $$A_k = E_k^T E_k. \quad (16)$$

2) Vector $d_k$ $$d_k = E_k^T q_k. \quad (17)$$

The merging operation carried out in Segment Merging block 2 determines whether two segments $S_i$ and $S_j$ can be combined into a new segment $S_k$ such that motion compensation with a common motion coefficient vector $c_k$ does not lead to excessive increase of the chosen error measure in $S_k$.

For a particular pair of segments $S_i$ and $S_j$ the merging operation consists of the following steps:

Step 1. Evaluation of common motion coefficients

This preferred embodiment of the invention makes use of a previously unknown property that $c_k$ can be found by solving the system of linear equations:

$$A_k c_k = d_k \quad (18)$$

where $$A_k = A_i + A_j, d_k = d_i + d_j. \quad (19)$$

$A_i$, $d_i$ and $A_j$, $d_j$ are produced by the Motion Analyzer block 1 for segments $S_i$ and $S_j$ respectively.

Step 2. Segment merging

Using motion coefficient vector $c_k$ it is decided whether segments $S_i$ and $S_j$ can be merged. If they are merged matrix $A_k$ and vector $d_k$ of newly created segment $S_k$ are calculated according to equation (19), ie.

$$A_k = A_i + A_j, d_k = d_i + d_j. \quad (20)$$

Steps 1–2 are applied to all neighbouring pairs of segments.

For each segment $S_k$ of the new segmentation obtained after Segment Merging the following values are calculated:

1) The $(N+M) \times (N+M)$ upper triangular matrix $R_k^1$, i.e., a matrix having the form $$\begin{bmatrix} x & x & x & \ldots & x \\ 0 & x & x & \ldots & x \\ 0 & 0 & x & \ldots & x \\ \vdots & \vdots & \vdots & \ddots & \vdots \\ 0 & 0 & 0 & \ldots & x \end{bmatrix}$$

where symbol x denotes a nonzero element, is obtained by calculating Cholesky factorization of matrix $A_k$:

$$A_k = (R_k^1)^T R_k^1. \quad (21)$$

2) Vector $z_k^1$ is obtained by solving the following set of equations $$(R_k^1)^T z_k^1 = d_k. \quad (22)$$

Matrix $R_k^1$ and vector $z_k^1$, together with segmentation information, are the input parameters for example to the Orthogonalisation block 3.

In the preferred implementation the following polynomial basis functions $f_n$ are used:

$$f_1(x,y) = f_4(x,y) = 1, f_2(x,y) = f_5(x,y) = y, f_3(x,y) = f_6(x,y) = x. \quad (23)$$

The linearization step is done by employing a first order Taylor expansion of $R_{ref}(.)$ around $$x_i' = x_i + \Delta x(x_i, y_i)$$
$$y_i' = y_i + \Delta y(x_i, y_i) \quad (24)$$

with respect to x and y:

$$R_{ref}(x_i + \hat{\Delta}x$$
$$(x_i, y_i), y_i + \hat{\Delta}y$$
$$(x_i, y_i)) \approx R_{ref}(x_i$$
$$', y_i') + (\hat{\Delta}x$$
$$(x_i, y_i) - \Delta x$$
$$(x_i, y_i))G_x$$
$$(x_i', y_i') + (\hat{\Delta}y$$
$$(x_i, y_i) - \Delta y$$
$$(x_i, y_i))G_y$$
$$(x_i', y_i'). \quad (25)$$

$G_x(x_i', y_i')$ and $G_y(x_i', y_i')$ are values of the derivative of the reference frame $R_{ref}(.)$ with respect to x and y. Using such approximation the elements of matrix $E_k$ and vector $q_k$ in equation (15) are:

$$e_{ij} = \begin{cases} f_j(x_i, y_i) G_x(x_i', y_i'), & j = 1, 2, \ldots, N \\ f_j(x_i, y_i) G_y(x_i', y_i'), & j = N+1, N+2, N+M, \end{cases} \quad (26)$$

$$q_i = I_n(x_i, y_i) - R_{ref}(x_i', y_i') - G_x(x_i', y_i')\Delta x(x_i, y_i) - G_y(x_i', y_i')\Delta y(x_i, y_i). \quad (27)$$

Common motion coefficient evaluation is carried out as follows. Equation 18 is solved by:

1) Calculating Cholesky factorisation of $(N+M)\times(N+M)$ matrix $A_k$ $$A_k = (R_k^1)^T R_k^1 \quad (28)$$

where $R_k^1$ is $(N+M)\times(N+M)$ upper triangular matrix.

2) Solving 2 sets of equations, first $$(R_k^1)^T z_k^1 = d_k \quad (29)$$

to obtain $z_k^1$ and later $$R_k^1 c_k = z_k^1 \quad (30)$$

to obtain the actual motion coefficient vector. Both can be solved by back substitution due to the usage of triangular matrices.

Merging of segments is performed as follows.

The Lagrangian cost of a segment $S_k$ is defined as:

$$L(S_k) = D(S_k) + \lambda R(S_k). \quad (31)$$

The distortion $D(S_k)$ is the square error between the original and the coded segment. The segment is coded by predicting it using motion coefficient vector $c_k$ and subsequently compressing the prediction error. The two dimensional (2-D) Discrete Cosine Transform (DCT) is used to compress the prediction error. The rate $R(S_k)$ is equal to the number of bits spent on coding the motion coefficients and the DCT coefficients. The parameter $\lambda$ has some predetermined value which gives the trade off parameter between the quality of coded frame and the number of bits required for its compression.

To decide whether segments $S_i$ and $S_j$ should be merged the reduction of the Lagrangian cost $\Delta L_{ij}$ if these segments would be merged into one segment $S_k$ is used as a criterion $$\Delta L_{ij} = (L(S_i) + L(S_j)) - L(S_k). \quad (32)$$

The motion coefficients necessary to obtain prediction of the segment $S_k$ are calculated using equation 18.

The segment merging procedure starts from the initial segmentation and proceeds as follows:

1) Those pairs of neighbouring segments $S_i$ and $S_j$ which have a $\Delta L_{ij}$ smaller than a—possibly negative— threshold are defined as 'non-neighbours'. (This step is especially important for reducing the overall computational cost, due to the significant reduction in the number of updates performed in step 4 below).

2) The pair of neighbouring segments which has the largest reduction of the Lagrangian cost among all the pairs is found.

3) If this reduction is larger than 0 merge these segments are merged.

4) Assuming that the index of the new merged segment is k, the reduction of the Lagrangian cost $\Delta L_{k1}$ for all the neighbouring segments $S_1$ ($l=1, \ldots, L$) of the newly created segment $S_k$ is recalculated as follows:

a) For $l=1, \ldots, L$ the increase in the square prediction error $\Delta e_{kl}$ in the combined area of segments $S_k$ and $S_l$, if they were merged to form new segment $S_m$, is calculated:

$$\Delta e_{kl} = (z_k^1)^T z_k^1 + (z_l^1)^T z_l^1 - (d_k^T + d_l^T) c_m. \quad (33)$$

b) The reduction of the Lagrangian cost is calculated proceeding from the segment for which the increase in square prediction error is smallest to the one for which the increase in square prediction error is largest. The calculations stop if a segment $S_l$ is encountered such that $\Delta L_{kl}$ is positive AND $\Delta e_{kl}$ is greater than a—possibly adaptive—threshold. For the remaining segments the reduction of the Lagrangian cost is set to some negative value.

5) Steps 1–3 are repeated until the Lagrangian cost reductions for all possible pairs are negative.

If the increase of the prediction error due to merging of segments $S_i$ and $S_j$ into one segment $S_k$ is smaller than some predefined threshold, matrix $A_k$, and vector $d_k$ are recalculated using equation 19, and then the common motion coefficient vector $c_k$ is calculated using equation 18. Otherwise:

1) the motion coefficient vector $c_k$ of the segment $S_k$ is found using motion estimation, 2) matrix $A_k$ and vector $d_k$ are recalculated using equations 16–17

In the evaluation of pixel values, the values of $R_{ref}(x,y)$ are defined only for integer coordinates x and y. When motion compensated prediction requires evaluating the luminance and chrominance values at non-integer locations (x,y) in the reference frame $R_{ref}$, cubic convolution interpolation is used. Image derivatives in the x and y direction, $G_x(x,y)$ and $G_y(x,y)$, are also computed using cubic convolution. The derivatives of the continuous function obtained by cubic convolution interpolation are computed, and they are interpreted as the image derivatives.

The present invention may be embodied in other specific forms without departing from its essential attributes. Accordingly reference should be made to the appended claims and other general statement's herein rather than to the foregoing specific description as indicating the scope of invention.

The system can be implemented in a variety of ways. The following may vary:

1) different polynomial basis functions can be used in equation 11.

2) different methods can be used to linearize in equation 12, 3) different criteria may be used to decided whether to merge or not to merge two segments, 4) different methods can be used to solve the set of equations 18.

Furthermore, each feature disclosed in this specification (which term includes the claims) and/or shown in the drawings may be incorporated in the invention independently of other disclosed and/or illustrated features. In this regard, the invention includes any novel features or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A video codec for motion compensated encoding of video data, the video codec providing a motion vector field of video pixels of a current frame to be coded relative to a reference frame, and having a motion field coder for coding the motion vector field to provide compressed motion information, the motion field coder including a motion analyzer comprising means for calculating and storing for each segment k of the current frame an approximation matrix $E_k$ and an approximation vector $q_k$ such that a predefined measure $\Delta e_k$ for distortion in each segment is a function of $(E_k c_k - q_k)$, $c_k$ being a vector approximating said motion vector field as motion coefficients $c_n$ of a set of polynomial basis functions $f_n$, and means for generating motion analyzer output parameters including an output matrix $A_k$ and an output vector $d_k$, wherein $A_k$ is the product of $E_k$ transpose and $E_k$, and $d_k$ is a product of $E_k$ transpose and $q_k$.

2. A video codec according to claim 1, wherein the motion field coder includes a segment merging block receiving the output of the motion analyzer, the segment merging block comprising merging means for merging pairs of neighbouring segments $S_i$ and $S_j$ if the pixel values in the combined area can be predicted using a common motion coefficient vector, said merging means determining a common motion coefficient vector $c_k$ for a merged segment $S_k$ by solving the linear equations $$A_k c_k = d_k$$

where $A_k$ is a merged matrix given by the sum of motion analyser output matrices $A_i$ and $A_j$, and $d_k$ is a merged vector given by the sum of motion analyser output vectors $d_i$ and $d_j$ of segments $S_i$ and $S_j$ respectively.

3. A video codec according to claim 2, wherein neighbouring segments may be defined as non-neighbours.

4. A video codec according to claim 2, wherein merging of segments $S_i$ and $S_j$ into one segment $S_k$ is based on reduction of the Lagrangian cost $\Delta L_{ij}$ according to the criteria $$\Delta L_{ij} = (L(S_i) + L(S_j)) - L(S_k).$$

5. A video codec according to claim 2, wherein said segment merging block comprises means for defining as non neighbours those pairs of neighbouring segments $S_i$ and $S_j$ which have a Lagrangian cost $\Delta L_{ij}$ lower than a predefined threshold, means for finding a pair of neighbouring segments that have the largest reduction of the Lagrangian cost amongst all pairs of neighbouring segments, and means for merging said neighbouring segments if the reduction exceeds zero.

6. A video codec according to claim 5, comprising means for recalculating the Lagrangian cost for neighbouring segments of newly created segment $S_k$ comprising means for calculating the increase in square prediction error $\Delta e_k$ in the combined area of $S_k$ and $S_l$ for $I=1, \ldots, L$ according to $$\Delta e_{kl} \approx (z_k^1)^T z_k^1 + (z_l^1)^T z_l^1 - (d_k^T + d_l^T) c_m$$

and calculating the reduction in Lagrangian cost proceeding from the segment for which the increase in prediction error is smallest to the one for which the increase in prediction error is largest until a segment $S_l$ is encountered such that $\Delta L_{kl}$ is positive and $\Delta e_{kl}$ exceeds a threshold.

7. A video codec according to claim 2, wherein if it is decided that segments $S_i$ and $S_j$ are to be merged then merged matrix $A_k$ and merged vector $d_k$ of segment $S_k$ are calculated as follows:

$$A_k = A_i + A_j, \quad d_k = d_i + d_j.$$

8. A video codec according to claim 2, wherein for each merged segment output parameters matrix $R_k^1$ and vector $z_k^1$ are provided, wherein 1) matrix $R_k^1$ is constructed in accordance with $$\begin{bmatrix} x & x & x & \ldots & x \\ 0 & x & x & \ldots & x \\ 0 & 0 & x & \ldots & x \\ \vdots & \vdots & \vdots & \ddots & \vdots \\ 0 & 0 & 0 & \ldots & x \end{bmatrix}$$

where symbol $\times$ denotes a nonzero element, and is obtained by factorization of matrix $A_k$:

$$A_k = (R_k^1)^T R_k^1.$$

and 2) vector $z_k^1$ is obtained by solving the set of equations $$(R_k^1)^T z_k^1 = d_k.$$

9. A method for motion compensated encoding of video data comprising providing a motion vector field of video pixels of a current frame to be coded relative to a reference frame, and coding the motion vector field to provide compressed motion information, said coding of the motion vector field comprising, calculating and storing for each segment k an approximation matrix $E_k$ and an approximation vector $q_k$ such that a predefined measure $\Delta e_k$ for distortion in each segment is a function of $(E_k c_k - q_k)$, $c_k$ being a vector approximating said motion vector field as motion coefficients $c_n$ of a set of polynomial basis functions $f_n$, and generating motion analyzer output parameters including an output matrix $A_k$ and an output vector $d_k$, wherein $A_k$ is the product of $E_k$ transpose and $E_k$, and $d_k$ is a product of $E_k$ transpose and $q_k$.

10. A method according to claim 9, comprising merging pairs of adjacent segments $S_i$ and $S_j$ if the pixel values in the combined area can be predicted using a common motion coefficient vector, comprising determining a common motion coefficient vector $c_k$ for a merged segment $S_k$ by solving the linear equations $$A_k c_k = d_k$$

where $A_k$ is a merged matrix given by the sum of motion analyser output matrices $A_i$ and $A_j$, and $d_k$ is a merged vector given by the sum of motion analyser output vectors $d_i$ and $d_j$ of segments $S_i$ and $S_j$ respectively.

11. A method according to 10, wherein neighbouring segments may be defined as non-neighbours.

12. A method according to claim 10, wherein merging of segments $S_i$ and $S_j$ into one segment $S_k$ is based on reduction of the Lagrangian cost $\Delta L_{ij}$ according to the criteria $$\Delta L_{ij} = (L(S_i) + L(S_j)) - L(S_k).$$

13. A method according to claim 9, wherein segmentation comprises defining as non neighbours those pairs of neighbouring segments $S_i$ and $S_j$ which have a Lagrangian cost $\Delta L_{ij}$ lower than a predefined threshold, finding a pair of neighbouring segments that have the largest reduction of the Lagrangian cost amongst all pairs of neighbouring segments, merging said neighbouring segments if the reduction exceeds zero.

14. A method according to claim 13 comprising recalculating the Lagrangian cost for neighbouring segments of newly created segment $S_k$ comprising calculating the increase in square prediction error $\Delta e_k$ in the combined area of $S_k$ and $S_l$ for $I=1, \ldots, L$ according to $$\Delta e_{kl} \approx (z_k^1)^T z_k^1 + (z_l^1)^T z_l^1 - (d_k^T + d_l^T) c_m$$

and calculating the reduction in Lagrangian cost proceeding from the segment for which the increase in prediction error is smallest to the one for which the increase in prediction error is largest until a segment $S_l$ is encountered such that $\Delta L_{kl}$ is positive and $\Delta e_{kl}$ exceeds a threshold.

15. A method according to claim 10, wherein if segments $S_i$ and $S_j$ are merged then merged matrix $A_k$ and merged vector $d_k$ of segment $S_k$ are calculated as follows:

$$A_k = A_i + A_j, \quad d_k = d_i + d_j.$$

16. A method according to claim 10, wherein for each merged segment output parameters matrix $R_k^1$ and vector $z_k^1$ are provided, wherein 1) matrix $R_k^1$ is constructed in accordance with $$\begin{bmatrix} x & x & x & \cdots & x \\ 0 & x & x & \cdots & x \\ 0 & 0 & x & \cdots & x \\ \vdots & \vdots & \vdots & \ddots & \vdots \\ 0 & 0 & 0 & \cdots & x \end{bmatrix}$$

where symbol $\times$ denotes a nonzero element, is obtained by factorization of matrix $A_k$:

$$A_k = (R_k^1)^T R_k^1.$$

and 2) vector $z_k^1$ is obtained by solving the set of equations $$(R_k^1)^T z_k^1 = d_k.$$

* * * * *